(12) United States Patent
Irle

(10) Patent No.: US 6,177,509 B1
(45) Date of Patent: Jan. 23, 2001

(54) AQUEOUS POLYMER DISPERSIONS NEUTRALIZED WITH N,N-DIISOPROPYL-N-ETHYLAMINE

(76) Inventor: Christoph Irle, Buschstr.165, 47800 Krefeld (DE)

( * ) Notice: Under 35 U.S.C. 154(b), the term of this patent shall be extended for 0 days.

(21) Appl. No.: 09/397,772

(22) Filed: Sep. 16, 1999

(30) Foreign Application Priority Data

Sep. 23, 1998 (DE) ............................................. 198 43 552

(51) Int. Cl.$^7$ ............................... C08J 3/00; C08K 3/20; C08L 75/00
(52) U.S. Cl. ......................... 524/591; 524/539; 524/839; 524/840
(58) Field of Search ................... 524/539, 591, 524/839, 840

(56) References Cited

U.S. PATENT DOCUMENTS

| | | | |
|---|---|---|---|
| 3,412,054 | 11/1968 | Milligan et al. | 260/18 |
| 4,801,644 | 1/1989 | Coogan | 524/839 |
| 5,075,370 | 12/1991 | Kubitza et al. | 524/591 |
| 5,252,696 | 10/1993 | Laas et al. | 528/49 |
| 5,331,039 | 7/1994 | Blum et al. | 524/507 |
| 5,344,873 | 9/1994 | Blum | 524/591 |
| 5,455,297 * | 10/1995 | Pedain et al. | 524/591 |
| 5,496,485 | 3/1996 | Maternaghan | 252/79.3 |
| 5,563,208 | 10/1996 | König et al. | 524/591 |

FOREIGN PATENT DOCUMENTS

| | | |
|---|---|---|
| 3209781 | 11/1982 | (DE) . |
| 379158 | 7/1990 | (EP) . |
| 0 511 457 | 4/1997 | (EP) . |
| 98/05696 | 2/1998 | (WO) . |

OTHER PUBLICATIONS

D. Dieterich Progress in Organic Coatings, 9 (month unavailable) 1981, pp. 281–340 Aqueous Emulsions, Dispersions and Solutions of Polyurethanes; Synthesis and Properties.

* cited by examiner

*Primary Examiner*—Patrick D. Niland
(74) *Attorney, Agent, or Firm*—Joseph C. Gil; Thomas W. Roy

(57) ABSTRACT

The present invention relates to aqueous polymer dispersions containing anionic salt groups neutralized with 0.05 to 5 wt. % of N,N-diisopropyl-N-ethylamine and 0 to 1.5 wt. % of other tertiary amines, wherein the preceding percentages are based on the weight of the aqueous polymer dispersions. The present invention also relates to one- and two-component coating compositions containing these aqueous polymer dispersions.

14 Claims, No Drawings

AQUEOUS POLYMER DISPERSIONS NEUTRALIZED WITH N,N-DIISOPROPYL-N-ETHYLAMINE

BACKGROUND OF THE INVENTION

1. Field of the Invention

The present invention relates to aqueous dispersions with reduced triethylamine content, a process for the preparation of such dispersions, and their use as binders for coatings.

2. Description of the Prior Art

With the aim of reducing emissions of organic solvents, aqueous coating compositions are increasingly replacing solvent-containing compositions. These aqueous compositions contain polymers, which are similar to those used in solvent-containing coatings with the exception that they contain hydrophilic groups to render the polymers water soluble and/or water dispersible. It is advantageous if these hydrophilic groups are incorporated into the polymer ("internal emulsifiers"), instead of being physically mixed with the polymer ("external emulsifiers").

The internal hydrophilic groups are anionic groups usually formed, e.g., from a carboxylic acid and a base. It is known from U.S. Pat. No. 3,412,054 to hydrophilically modify polyurethanes by incorporating compounds containing hydroxy and carboxylic acid groups, such as dimethylolpropionic acid, and neutralizing the Bases (for example, metal salts such as alkali metal hydroxides or amines) are used to neutralize the incorporated hydrophilic groups. Amines have an advantage over metal salts because they evaporate and, thus, do not remain in the dried paint film after application of the binder. Therefore, the hydrophilicity and water sensitivity of the coating is significantly reduced. However, primary and secondary amines have the disadvantage that they react with isocyanates.

Isocyanate group-containing compounds are used for preparing aqueous dispersions. Particularly in the preparation of polyurethane dispersions (see for example D. Dieterich, Prog. Org. Coatings 9, 281 (1981), EP-A 220,000, EP-A 511,547 and WO 98/05696), prepolymers are often obtained in intermediate stages that contain free isocyanate groups as well as neutralizing bases.

Also, in the application of aqueous two-component polyurethane coating compositions containing polyisocyanate crosslinking agents and aqueous polyol dispersions (see for example EP-A 358,979, EP-A 537,568 and EP-A 542,105) neutralizing agents and isocyanate groups from the crosslinking agent come into contact with one another.

Particularly in these two cases, tertiary amines free of hydroxyl groups are increasingly used as neutralizing agents since they do not react with isocyanate groups. Due to its ready availability, triethylamine is generally used as the neutralizing amine. However, the release of corrosive triethylamine from aqueous coating compositions is a disadvantage for ecological reasons. Accordingly, paint users as well as paint manufacturers have attempted to reduce the triethylamine content in aqueous dispersions with out impairing paint quality.

Replacement of triethylamine with ammonia, primary and secondary amines, hydroxyl group-containing tertiary amines and tertiary amines having relatively long alkyl substituents alternatives have not been successful.

Ammonia reacts rapidly with isocyanate groups. In addition, ammonia-neutralized binders in pigmented paints exhibit considerably worse pigment wetting.

Primary and secondary amines, as well as hydroxyl group-containing tertiary amines, react with isocyanates. Hydroxyl group-containing tertiary amines are also considerably less volatile than triethylamine, which is reflected in the poorer water resistance of the coating in the first few days after paint application.

Tertiary amines with relatively long alkyl substituents also have the disadvantage compared to triethylamine of insufficient volatility. Experience has also shown that resins neutralized with long chain tertiary amines are more difficult to disperse than triethylamine-neutralized resins.

An object of the present invention is to provide an amine for neutralizing aqueous dispersions that is at least an equivalent replacement for the ecologically less desirable triethylamine, but which does not have the disadvantages of the previously discussed alternative neutralizing amines for aqueous dispersions.

This object may be achieved according to the present invention by using N,N-diisopropyl-N-ethyalmine as the neutralizing amine in the preparation of aqueous dispersions.

SUMMARY OF THE INVENTION

The present invention relates to aqueous polymer dispersions containing anionic salt groups neutralized with 0.05 to 5 wt. % of N,N-diisopropyl-N-ethylamine and 0 to 1.5 wt. % of other tertiary amines, wherein the preceding percentages are based on the weight of the aqueous polymer dispersions.

The present invention also relates to one- and two-component coating compositions containing these aqueous polymer dispersions.

DETAILED DESCRIPTION OF THE INVENTION

The aqueous polymer dispersions according to the invention accordingly contain hydrophilic salt groups neutralized with 0.05 to 5 wt. %, preferably 0.25 to 2 wt. % and more preferably 0.4 to 1.5 wt. % of N,N-diisopropyl-N-ethylamine and 0 to 1.5 wt %, preferably 0 to 0.9 wt %, of other tertiary amines. The neutralizing agents may be present in either protonated or neutral form.

Suitable aqueous polymer dispersions for use according to the invention include polyacrylate, polyurethane, polyester, polyolefin and/or polyepoxy resin dispersions, preferably urethane group-containing dispersions, mixed dispersions of the preceding types and mixtures of dispersions.

The aqueous polymer dispersions according to the invention are prepared by neutralizing an acid group-containing polyacrylate, polyurethane, polyester, polyolefin and/or polyepoxy resin with N,N-diisopropyl-N-ethylamine, optionally mixed with other amines, and then dispersing the neutralized resin in water.

In a particularly preferred embodiment isocyanate group-containing prepolymers are neutralized with N,N-diisopropyl-N-ethylamine without the addition of other amines and then dispersed in water and chain extended, as described, for example, in EP-A 220,000, EP-A 511,547 or WO 98/05696.

The aqueous polymer dispersions according to the invention that contain N,N-diisopropyl-N-ethylamine are especially suitable as paint binders. Preferably, they are used as binders in physically drying one-component coating compositions that crosslink by radiation or atmospheric oxygen. More preferably they are used as the polyol component in aqueous two-component polyurethane coating compositions.

Preferred aqueous polymer dispersions are polyurethane dispersions containing

A1) polyisocyanates,
A2) polymeric polyols having number average molecular weights of 400 to 6000,
A3) optionally monoalcohols,
A4) polyols, aminopolyols and polyamines having a number average molecular weight of less than 400,
A5) mono-, di- or polyols and/or mono-, di- or polyamines that have a salt group (anionic group) or a functional group that can be converted into a salt group (potential anionic group).

Suitable polyisocyanates A1) include diisocyanates corresponding to the formula, $R_1(NCO)_2$, wherein $R_1$ represents an aliphatic hydrocarbon radical having 4 to 12 carbon atoms, a cycloaliphatic hydrocarbon radical having 6 to 15 carbon atoms, an aromatic hydrocarbon radical having 6 to 15 carbon atoms, or an araliphatic hydrocarbon radical having 7 to 5 carbon atoms. Examples include tetramethylene diisocyanate, hexamethylene diisocyanate, 4,4'-diisocyanatodiphenylmethane, 2,4'-diisocyanato-diphenylmethane, 2,4-diisocyanatotoluene, 2,6-diisocyanato-toluene and α,α,α',α'-tetramethyl-m- or p-xylylene diisocyanate as well as mixtures of the aforementioned diisocyanates. Preferred diisocyanates include 1-isocyanato-3,3,5-trimethyl-5-isocyanatomethyl-cyclohexane (isophorone diisocyanate) and 4,4'-diisocyanato-dicyclohexylmethane.

Also suitable as polyisocyanates A1) are polyisocyanates that contain isocyanurate, biuret, uretdione and/or carbodiimide groups. Such polyisocyanates may have high functionalities, for example, of 3 or more.

Suitable polymeric polyols A2) are known and include polyols having a number average molecular weight of 400 to 6000, preferably 600 to 2500, and an OH functionality of 1.8 to 4, preferably 2 to 3. Examples include polyesters, polyethers, polycarbonates, polyester carbonates, polyacetals, polyolefins and polysiloxanes. Polymeric polyols A2) may also contain ethylenically unsaturated groups.

In addition to the use of difunctional OH components it is also possible to terminate the polyurethane prepolymer with a monofunctional alcohol A3). Suitable monoalcohols also include those having polymerizable functional groups, such as hydroxy-functional (meth)acrylic acid esters, and also ethanol, i-propanol, n-propanol, n-butanol, n-pentanol and saturated or unsaturated fatty alcohols.

Examples of polyols, aminopolyols and polyamines A4), which have a number average molecular weight of less than 400, include the known chain extenders from polyurethane or polyurethane dispersion chemistry. Examples include ethane diol, butane diol-1,4, cyclohexanedimethanol, trimethylolpropane, glycerol, ethylene-diamine, 1,4-diaminobutane, isophorone diamine and 4,4'-diaminodicyclohexyl-methane.

Component A5) is selected from low molecular weight monools, diols, polyols, monoamines, diamines and polyamines, which contain functional groups, such as acid groups, that are capable of forming an ionic group. Examples include dimethylolpropionic acid, hydroxypivalic acid, hydroxyethylsulfonic acid, taurine and addition products of (meth)acrylic acid and polyamines.

In order to provide additional hydrophilicity, the polyurethane dispersions may also be prepared from monofunctional polyoxyalkylene ethers that contain at least one OH group per molecule and are based on the reaction product of an alcohol and ethylene oxide/propylene oxide and have a number average molecular weight of 250 to 3000. These alcohols fall within the scope of component A2) or A3) depending upon their functionality. It is known that these compounds are hydrophilic and improve the dispersion of the PUR in water.

The preparation of the polyurethane dispersions is carried out in known manner by reacting the polyisocyanate component with the polymeric polyol and the low molecular weight components to form a polyurethane. The reaction may be prepared in the presence or absence of a solvent, which may subsequently be removed.

In an additional step the groups capable of forming salt groups are neutralized by reaction with N,N-diisopropyl-N-ethylamine in a molar ratio of for example 1:0.5 to 1:2. The dispersion is then produced by adding water.

In a preferred embodiment of the process NCO groups are present during the preparation of the dispersion. These groups undergo chain extension after or during the dispersion step. The NCO groups may be reacted with chain extenders (for example polyamines) added to the dispersion, or with water. If a low boiling solvent is used, it can be separated and/or recovered by distillation.

Depending on the degree of neutralization, the dispersion may be adjusted to a very fine, particulate form, so that it practically has the appearance of a solution. However, very coarse particulates are also possible that are similarly sufficiently stable. The solids content may also be varied within wide limits of, for example, 20 to 50 wt. %.

The polyurethane dispersions prepared in this way may be modified in a further step by acrylate polymerization, as described, e.g., in DE-A 1,953,348 and DE-A 1,953,349.

The neutralization can be carried out by reacting the acid groups with pure N,N-diisopropyl-N-ethylamine and also with mixtures of N,N-diisopropyl-N-ethylamine and other amines. A mixture of N,N-diisopropyl-N-ethylamine and triethylamine may be used as the neutralizing mixture in accordance with the invention since it improves environmental concerns when compared to a dispersion neutralized with pure triethylamine.

The dispersions are used according to the invention as binders in coatings that dry physically, chemically or by free-radical polymerization of C=C-double bonds. A preferred use is in combination with polyisocyanates, especially water dispersible polyisocyanates, such as those described in EP-A 540,985 (U.S. Pat. No. 5,252,696, herein incorporated by reference).

EXAMPLES

Example 1

Polyurethane Dispersion 1

377.7 g (0.38 mole) of a polyester of adipic acid, hexanediol and neopentyl glycol (OH number 112 mg KOH/g), 27.2 g (0.26 mole) of neopentyl glycol, 38.3 g (0,29 mole) of dimethylolpropionic acid and 223.6 g of N-methylpyrrolidone were heated at 70° C. and stirred until a clear solution has formed. 380.6 g (1.45 mole) of 4,4'-diisocyanatodicyclohexylmethane (Desmodur W, Bayer AG) were then added. An exothermic reaction took place. The reaction mixture was held at 100° C. until the NCO content was 4.4 wt. %. The reaction mixture was then cooled to 50° C. and 37.0 g (0.29 mole) of N,N-diisopropyl-N-ethylamine were added. The mixture was then homogenized by stirring for 10 minutes. 850.0 g of the neutralized resin solution were dispersed by stirring into 1000.0 g of warm water at 40° C. The mixture was stirred for a further 5 minutes and then a solution of 10.6 g (0.18 mole) of ethylene diamine and 12.1 g (0.12 mole) of diethylene triamine in 10.9 g of water was added over a period of 20 minutes. The product was a finely divided, particulate polyurethane dispersion having a mean particle size of 48 nm (determined by laser correlation spectroscopy), a solids content of 35.5%, and a pH of 8.3.

Example 2
(Comparison) Polyurethane Dispersion 2

The preparation was carried out according to Example 1 with the exception that 28.9 g of triethylamine were used instead of N,N-diisopropyl-N-ethylamine for neutralization. The product was a finely divided, particulate polyurethane dispersion having a mean particle size of 54 nm (determined by laser correlation spectroscopy), a solids content of 36.2%, and a pH of 8.0.

Example 3
(Comparison) Polyurethane dispersion 3

The preparation was carried out according to Example 1 with the exception that 28.9 g of N-methylmorpholine were used instead of N,N-diisopropyl-N-ethylamine for neutralization. The product was a milky polyurethane dispersion with a coarse precipitate.

Example 4
Formulation of clear coating compositions from polyurethane dispersions 1 and 2

To formulate clear coating compositions the following components were added to 100 parts each of dispersions 1 and 2:

Co-solvent: N-methylpyrrolidone (2 parts by wt.), butyl glycol/water 1:1 (10 parts by wt.)

Defoaming agent: Tego Foamex 805 (Rego Chemie), form as supplied (0.2 part by wt.)

Additive to improve substrate wetting: Byk 346 (Byk Chemie), as supplied (0.5 part by wt.)

Thickener: Acrysol RM (Rohm and Haas), 8.5% in water (1.0 part by wt.)

In order to determine film hardness (pendulum dampening DIN 53 157), the coating compositions were applied in a wet film layer thickness of 200µm to glass plates. In order to determine resistance to water and ethanol (50% aqueous solution), the clear coating compositions were applied in 3 layers of 100 g/m² to oakwood plates, and then dried in each case at room temperature. Before application of the second and third layers, the coatings were lightly sanded. The resistances were determined according to the following method: cotton wool pads impregnated with the solvent were placed on 7-day-old coatings and covered with Petri dishes. After contact for 24 hours (water) and 30 minutes (ethanol), the surfaces were examined after the coatings had been carefully dried with a paper towel or the like. Damage was evaluated according to a scale from 0 (no change) to 5 (severe damage, film dissolved).

Test results:

| Polyurethane Dispersion | Film hardness | | | Resistances | |
|---|---|---|---|---|---|
| | after 3 hrs. | after 1 day | after 7 days + 1 day 50° C. | Water | Ethanol |
| 1 | 24" | 80" | 108" | 1 | 4 |
| 2 | 25" | 78" | 112" | 0–1 | 4 |

Example 5
Radiation-hardening polyurethane dispersion 230.4 g of a polyether acrylate (trimethylolpropane reacted with 4 moles of ethylene oxide and then esterified with 1 mole of acrylic acid per mole of OH, hydroxyl value 156 mg KOH/g), 136.0 g of a polyester diol prepared from adipic acid, hexane diol and neopentyl glycol (molar ratio of diols 65:35, OH number 66 mg KOH/g), 21.4 g of dimethylolpropionic acid and 0.3 g of dibutyl tin dilaurate were dissolved in 211.3 g of acetone. A mixture of 102.2 g of isophorone diisocyanate and 50.4 g hexamethylene diisocyanate was added dropwise while stirring so that the temperature was maintained between 50° C. and 65° C. As soon as the isocyanate content had dropped to 3.6%, the reaction mixture was cooled to 40° C. and a mixture of 9.3 g of triethylamine and 9.0 g of N,N-diisopropyl-N-ethylamine was added. After standing for 5 minutes the reaction mixture was transferred while stirring vigorously to 1177 g of water. 20.6 g of ethylene diamine dissolved in 61.6g of water were then added dropwise over a period of 10 minutes. After stirring for 30 minutes the acetone was distilled off under vacuum.

The dispersion obtained had a solids content of 35.2%, a viscosity of 30 mPa·s at 23° C. and a pH of 8.4.

Example 6
Oxidatively Drying polyester-polyurethane Dispersion 1

2257.5 g of a polyester of phthalic anhydride (0.57 mole), isophthalic acid (1.71 mole), soya oil fatty acid (2.85 mole), peanut oil fatty acid (1.14 mole), benzoic acid (2.85 mole) and pentaerythritol (4,56 mole) having an acid number of 3 mg of KOH/g and an OH number of 170 mg KOH/g, 175.5 g of dimethylolpropionic acid, 225.8 g of N-methylpyrrolidone and 3.0 g of dibutyl tin oxide were placed in a 4 liter reaction vessel equipped with stirrer and cooling and heating devices, and the mixture was homogenized for 30 minutes at 140° C. After cooling to 130° C., 114 g of isophorone diisocyanate were added, the mixture was stirred for 1 hour at 130° C. and cooled to 80° C., and a further 453 g of isophorone diisocyanate were added. The whole was then stirred at 120 to 130° C. until NCO groups were no longer detected. 217 g of butyl glycol, 29.3 g of ethoxylated nonyl phenol and 23.7 g of cobalt octoate were then added and the mixture was homogenized. An 87% resin melt of a water reducible alkyd resin was obtained, which had an acid value of about 27 and contained free hydroxyl groups. 105 g of N,N-diisopropyl-N-ethylamine were added at about 95° C. and homogenized for about 30 minutes; the mixture was then dispersed with 3160 g of distilled water. After stirring for a further two hours at 50 to 60° C., 22 g of an anti-skinning agent (Ascinin conc., Bayer) were added and the solution was filtered. An aqueous alkyd resin was obtained having a mean particle size of 83 nm (determined by laser correlation spectroscopy), a solids content of 44% and a pH of 6.8.

Using Triethylamine instead of N,N-diisopropyl-N-ehtlyamine yields a dispersion with nearly the same properties (Example 7):

Example 7
(Comparison) Oxidatively drying polyester-polyurethane dispersion 2

The procedure of Example 6 was repeated with the exception that 76 g of triethylamine were used instead of N,N-diisopropyl-N-ethylamine. An aqueous alkyd resin was obtained having a mean particle size of 102 nm (determined by laser correlation spectroscopy), a solids content of 44% and a pH of 6.8.

Although the invention has been described in detail in the foregoing for the purpose of illustration, it is to be understood that such detail is solely for that purpose and that variations can be made therein by those skilled in the art without departing from the spirit and scope of the invention except as it may be limited by the claims.

What is claimed is:

1. An aqueous polyurethane dispersion containing anionic salt groups neutralized with 0.05 to 5 wt. % of N,N-diisopropyl-N-ethylamine and 0 to 1.5 wt. % of other tertiary amines, wherein the preceding percentages are based on the weight of the aqueous polymer dispersion.

2. The aqueous polymer dispersion of claim 1 wherein the anionic salt groups are neutralized with 0.25 to 2 wt % of N,N-diisopropyl-N-ethylamine and 0 to 0.9 wt. % of other tertiary amines, wherein the preceding percentages are based on the weight of the aqueous polymer dispersion.

3. The aqueous polymer dispersion of claim 1 wherein the anionic salt groups are neutralized with 0.4 to 1.5 wt. % of N,N-diisopropyl-N-ethylamine and 0 to 0.9 wt. % of other tertiary amines, wherein the preceding percentages are based on the weight of the aqueous polymer dispersion.

4. The aqueous polymer dispersion of claim 1 wherein the aqueous polymer dispersion is an aqueous polyurethane dispersion containing carboxyl groups.

5. The aqueous polymer dispersion of claim 2 wherein the aqueous polymer dispersion is an aqueous polyurethane dispersion containing carboxyl groups.

6. The aqueous polymer dispersion of claim 3 wherein the aqueous polymer dispersion is an aqueous polyurethane dispersion containing carboxyl groups.

7. The aqueous polymer dispersion of claim 1 wherein the aqueous polymer dispersion is an aqueous polyurethane dispersion containing hydroxyl groups.

8. The aqueous polymer dispersion of claim 2 wherein the aqueous polymer dispersion is an aqueous polyurethane dispersion containing hydroxyl groups.

9. The aqueous polymer dispersion of claim 3 wherein the aqueous polymer dispersion is an aqueous polyurethane dispersion containing hydroxyl groups.

10. The aqueous polymer dispersion of claim 1 wherein the aqueous polymer dispersion is an aqueous polyurethane dispersion containing carboxyl and hydroxyl groups.

11. The aqueous polymer dispersion of claim 2 wherein the aqueous polymer dispersion is an aqueous polyurethane dispersion containing carboxyl and hydroxyl groups.

12. The aqueous polymer dispersion of claim 3 wherein the aqueous polymer dispersion is an aqueous polyurethane dispersion containing carboxyl and hydroxyl groups.

13. A two-component coating composition containing the aqueous polymer dispersion of claim 7 and a polyisocyanate.

14. A two-component coating composition containing the aqueous polymer dispersion of claim 10 and a polyisocyanate.

* * * * *

UNITED STATES PATENT AND TRADEMARK OFFICE
CERTIFICATE OF CORRECTION

PATENT NO.    : 6,177,509 B1
DATED         : January 23, 2001
INVENTOR(S)   : Christoph Irle It is certified that error appears in the above-identified patent and that said Letters Patent is hereby corrected as shown below:

<u>Title page,</u>
Item "[76], Inventor:", insert -- Assignee: Bayer Aktiengesellschaft, Leverkusen, Germany --.

Signed and Sealed this

Eleventh Day of June, 2002

*Attest:*

*Attesting Officer*

JAMES E. ROGAN
*Director of the United States Patent and Trademark Office*